(12) United States Patent
Cartagena et al.

(10) Patent No.: US 10,474,208 B2
(45) Date of Patent: Nov. 12, 2019

(54) SYSTEMS, METHODS AND DEVICES FOR USING THERMAL MARGIN OF A CORE IN A PROCESSOR

(71) Applicant: INTEL CORPORATION, Santa Clara, CA (US)

(72) Inventors: Daniel G. Cartagena, Chandler, AZ (US); Corey D. Gough, Hillsboro, OR (US); Vivek Garg, Folsom, CA (US); Nikhil Gupta, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 712 days.

(21) Appl. No.: 15/086,456

(22) Filed: Mar. 31, 2016

(65) Prior Publication Data

US 2017/0285700 A1    Oct. 5, 2017

(51) Int. Cl.
| G06F 1/20 | (2006.01) |
| G06F 1/32 | (2019.01) |
| G06F 1/3206 | (2019.01) |
| G06F 1/324 | (2019.01) |
| G06F 1/3296 | (2019.01) |

(52) U.S. Cl.
CPC .............. *G06F 1/206* (2013.01); *G06F 1/324* (2013.01); *G06F 1/3206* (2013.01); *G06F 1/3296* (2013.01); *Y02D 10/126* (2018.01); *Y02D 10/16* (2018.01); *Y02D 10/172* (2018.01)

(58) Field of Classification Search
CPC ........ G06F 1/206; G06F 1/3296; G06F 1/324; G06F 1/3206
See application file for complete search history.

(56) References Cited

U.S. PATENT DOCUMENTS

| 9,690,363 | B2 * | 6/2017 | Park ...................... G06F 1/3296 |
| 10,031,180 | B2 * | 7/2018 | Chinnakkonda Vidyapoornachary ...................... G01R 31/3008 |
| 10,151,786 | B2 * | 12/2018 | Jain ...................... G01R 31/025 |
| 2010/0064162 | A1 | 3/2010 | Rotem et al. |
| 2010/0229012 | A1 | 9/2010 | Gaskins et al. |
| 2012/0221873 | A1 | 8/2012 | Wells et al. |
| 2014/0095912 | A1 | 4/2014 | Hurd et al. |
| 2015/0106642 | A1 | 4/2015 | Naffziger et al. |

OTHER PUBLICATIONS

PCT/US2017/015868, International Search Report and Written Opinion, dated May 12, 2017, 12 pages.

\* cited by examiner

*Primary Examiner* — Stefan Stoynov
(74) *Attorney, Agent, or Firm* — Stoel Rives LLP

(57) ABSTRACT

A dynamic adjustment of core power can reduce thermal margin between thermal design power (TDP) and an allowable thermal load. For example, by focusing directly on the core temperatures explicitly, a per-core closed loop temperature controller (pCLTC) can remove conservatism induced by the power level 1 policy (PL1, a policy which defines frequency and/or power for the processor under sustained load) thereby allowing for increased processor performance when there exists margin in the thermal system.

21 Claims, 8 Drawing Sheets

SYSTEMS, METHODS AND DEVICES FOR USING THERMAL MARGIN OF A CORE IN A PROCESSOR

TECHNICAL FIELD

The present disclosure relates to power control in processors and more specifically to dynamic adjustment of core power to reduce thermal margin between thermal design power (TDP) and an allowable thermal load.

DETAILED DESCRIPTION

Figure 1:
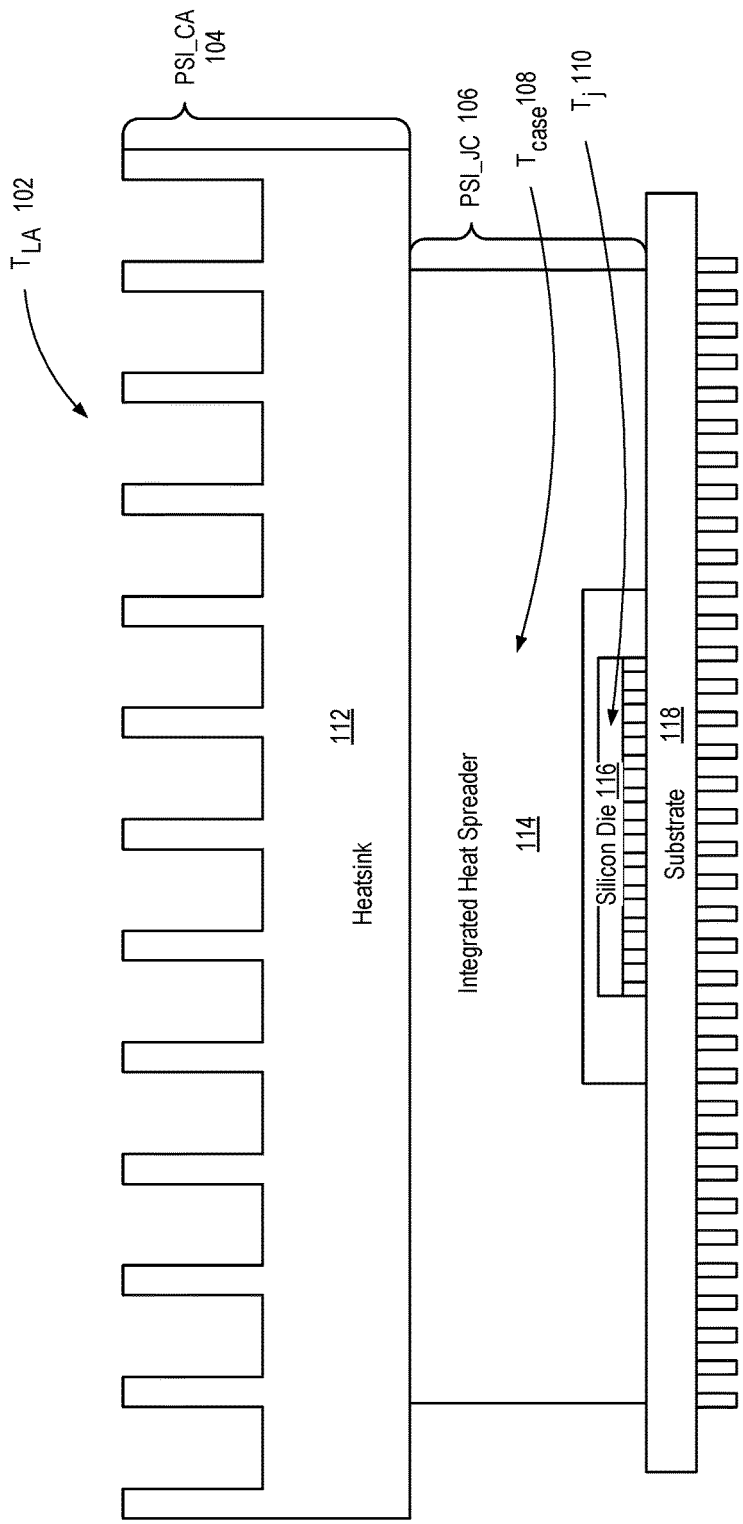
FIG. 1 is a schematic diagram illustrating a processor thermal design consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable dynamic adjustment of core power to reduce thermal margin between thermal design power (TDP) and an allowable thermal load. For example, by focusing directly on the core temperatures explicitly, a per-core closed loop temperature controller (pCLTC) can remove conservatism induced by the power level 1 policy (PL1, a policy which defines frequency and/or power for the processor under sustained load) thereby allowing for increased processor performance when there exists margin in the thermal system.

In one embodiment, an objective of a pCLTC policy is to calculate a power budget such that the processor temperature is at a desired setpoint temperature (Tsp) which is slightly below a temperature at which a processor is throttled (T_trip). In this manner, a maximum allowable processor performance is defined.

By migrating from PL1 to dynamic temperature control, central processing unit (CPU) users can benefit from increased performance under a wide variety of conditions commonly present (e.g., temperatures lower than the TDP, differing core thermal dissipation, etc.). In addition, pCLTC can allow customers that are willing to design (or already have installed) thermal systems or datacenters with improved cooling capabilities to derive direct performance benefits from such investments.

Some server customers, including cloud service providers, can be sensitive to maximum performance expectations. As such, a turbo function (or running a processor above a steady-state TDP-stable frequency) is a highly valued feature. However, the performance of turbo can be unnecessarily limited by existing thermal protections features which limit the amount of time spent in turbo based on power rather than temperature measurements.

In some embodiments, CPUs are bound by maximum voltage, current and temperature reliability constraints. Voltage constraints can be managed by fuse settings. Current constraints can be managed by an Iccmax policy implemented in power controller firmware, hardware and/or software (e.g., pcode). In some embodiments, server processors can maintain compliance with maximum temperature constraint by a combination of thermal settings (e.g., PROCHOT) and PL1 policy features. The definitions for these features (PROCHOT and PL1) are described as follows.

For a PROCHOT example, if the processor exceeds the maximum allowable junction temperature, a catastrophic thermal event is said to have occurred and a PROCHOT feature implemented in pcode can aggressively throttle a processor's voltage and frequency to a power setting (Pm). This can be a highly undesirable event as it can impose a drastic performance penalty. The temperature at which PROCHOT is asserted is herein referred to as T_trip.

For a PL1 example, platform thermal solutions are designed to a TDP specification of processor power. At a specified max local ambient temperature, a reference thermal solution will provide sufficient cooling such that if the CPU power is sustained at TDP for long periods of time, the CPU temperature will be at T_TDP, which is below T_trip (which is the junction temperature which would engage PROCHOT).

PL1 implicitly achieves compliance with temperature constraint by maintaining average power to TDP by dynamic voltage and frequency scaling (DVFS). This can leave performance on the table as lower voltage/frequencies are selected unnecessarily (e.g., when an ambient temperature is lower than the TDP design, etc.). A per-core closed loop thermal controller (pCLTC) can replace the PL1 loop and provide explicit temperature control. The explicit temperature control can take advantage of a margin in the thermal system (e.g., between TDP and actual temperature) to provide greater allowable performance across workloads than PL1 alone. By leveraging linear system theory and dynamic modeling, the closed loop controller can be tuned to additional performance results and further minimize conservatism.

A somewhat related technology, RATL (running average temperate limit), however, is not used to define maximum allowable instantaneous power budget. Instead, RATL is used to define an alternative instantaneous allowable temperature junction maximum temperature (Tjmax). RATL is used to change what Tjmax the processor throttles at. RATL allows for junction temperature (Tj) to exceed Tjmax over short durations so long as the exponentially weighted moving average (EWMA) calculated Tj_average is below Tj_max.

FIG. 1 shows a processor thermal design, including thermal relationships. A substrate 118 is coupled to a silicon die 116 and an integrated heat spreader 114. A heatsink 112 is coupled to the integrated heat spreader 114. A junction temperature (Tj) 110 is measured at the border between the silicon die 116 and integrated heat spreader 114. A case temperature (Tcase) 108 is measured at the integrated heat spreader 114. An ambient temperature ($T_{LA}$) 102 is measured at or near the heatsink 112. Case to ambient thermal resistance (PSI_CA) 104 quantifies a reference heatsink's thermal resistance. Junction to case thermal resistance (PSI_JC) 106 quantifies a thermal resistance from the silicon die 116 to heatsink 112.

To illustrate how thermal margin presents itself in systems, relevant steady state thermal relationships are shown:

$$T\_TDP = (P\_TDP * PSI\_JC) + T\_case\_max \quad (EQ\ \#1)$$

T_TDP is a steady state junction temperature (° C.) under steady state TDP conditions (as measured by the maximum temperature across the die). P_TDP is a specified package processor Thermal Design Power (in Watts). PSI_JC 106 is a junction to case thermal resistance (° C./Watt). T_case_max is a maximum temperature at the center of the top of the integrated heat spreader of the processor package (i.e., under steady state TDP).

$$T\_case\_max = (P\_TDP * PSI\_CA) + T\_LA\_max \quad (EQ\ \#2)$$

PSI_CA 104 is a case to ambient thermal resistance (° C./Watt) that quantifies the reference heatsink's thermal resistance. T_LA_max is a specified maximum local ambient temperature (in ° C.).

In some embodiments, the required PSI_CA 104 is specified to original equipment manufacturers (OEMs) to design heatsinks. Through this specification, sustained TDP power can be designed to not cause a thermal trip. Under the above assumptions, a following relationship is preserved:

$$T\_TDP < T\_Trip \quad (EQ\ \#3)$$

Since the processor is permitted to run at turbo frequencies that consume more power than TDP, PL1 can be used to ensure average processor power over a relatively long interval (e.g., five seconds) equals TDP. Using this design, the processor may exceed T_trip in cases where a thermal solution fails.

While PL1 can ensure that EQ #3 holds under the specified conditions, it can also impose significant conservatism (e.g., thermal margin). A margin between T_TDP and T_Trip can be significant under any of the following conditions (or combination thereof): (1) the local ambient temperature is below T_LA_max; (2) PSI_CA is less than specified (a better thermal solution than the reference design); (3) PSI_JC is less than specified due to a less aggressive workload specific powermap than assumed in EQ #2; and (4) given core's temperature is less than the package temperature.

Figure 2:
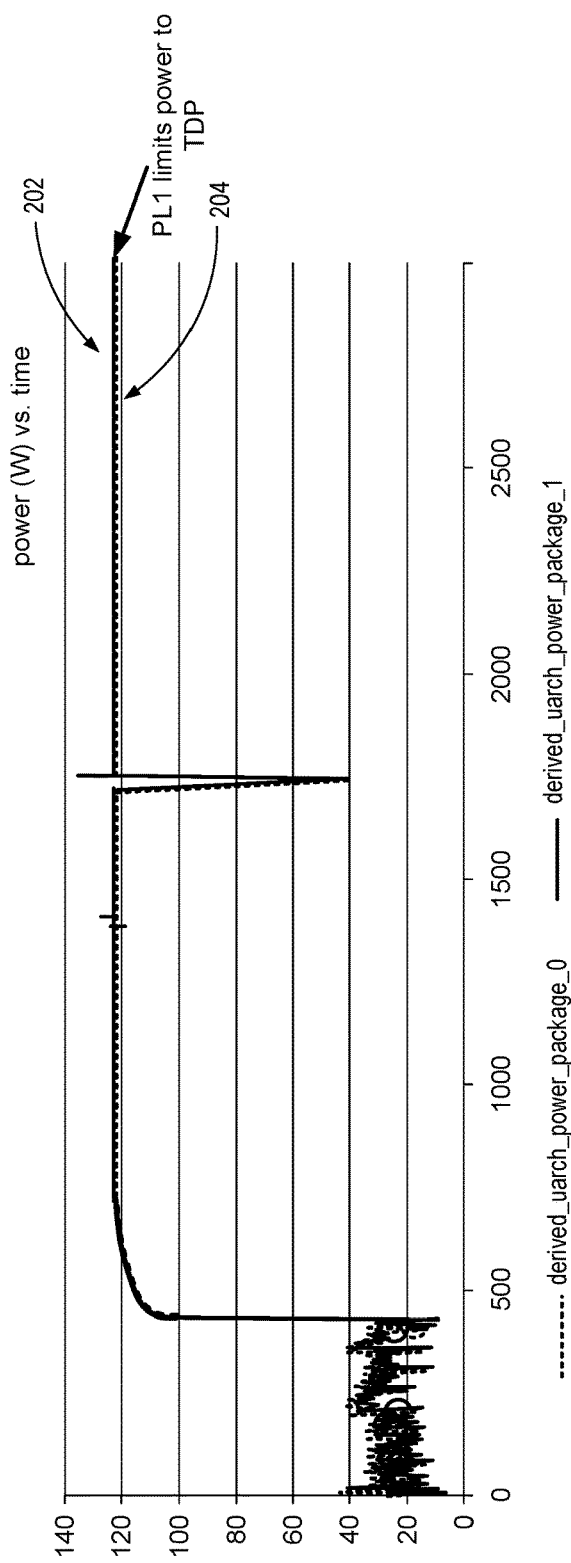
FIG. 2 is a graph illustrating processors limited to TDP consistent with embodiments disclosed herein.
Figure 3:
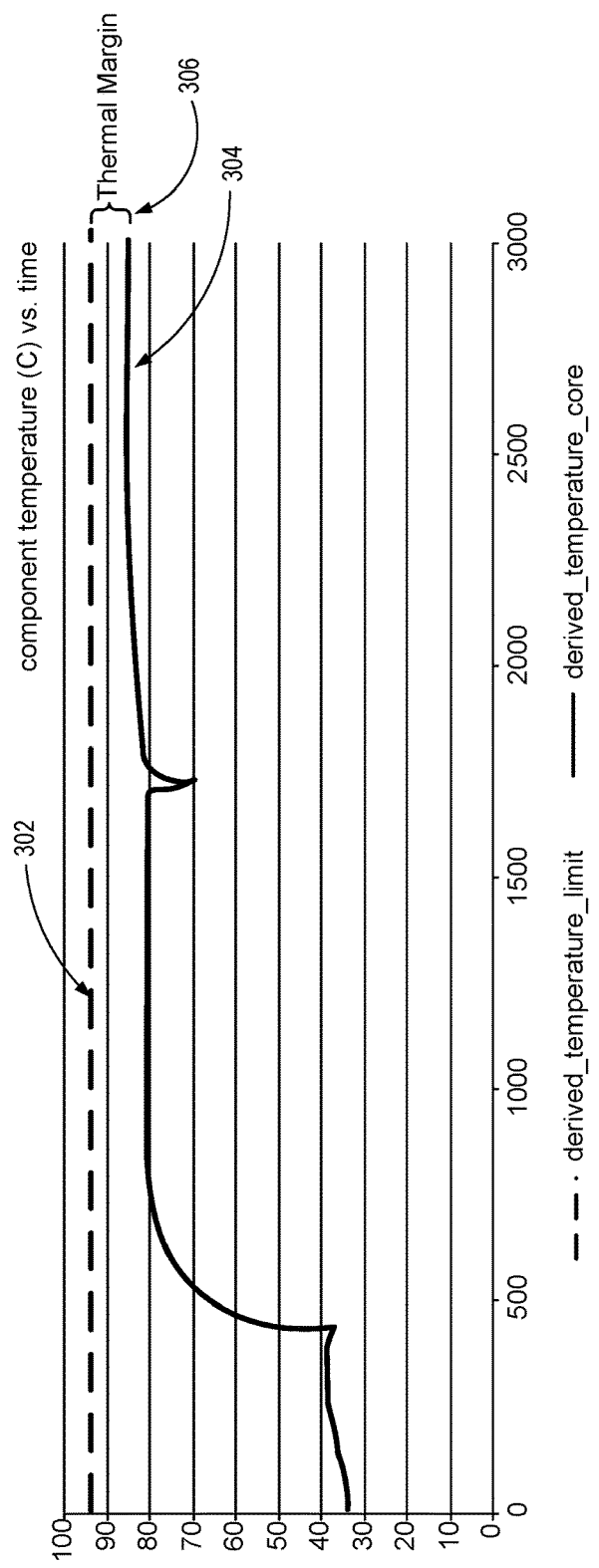
FIG. 3 is a graph illustrating processors thermal margin when confined to TDP consistent with embodiments disclosed herein.

FIGS. 2 and 3 show a graphical example of a processor running a workload where PL1 is limiting performance to TDP levels (FIG. 2) while the maximum die temperature remains below the temperature limits (FIG. 3). This thermal margin represents performance opportunity to the CPU. In FIG. 2, a first core power 202 and second core power 204 run near the TDP as confined by PL1. This provides a thermal margin 306 as shown in FIG. 3. The temperature of a core 304 is below a temperature limit 302 (e.g., T_trip).

For example, where a core's temperature is less than the package temperature (e.g., number 4 from above), cross-die thermal gradients are present. Consequently, each core can be at a different temperature. Even when one given core is near the trip point, other cores can have thermal margin from the trip point. As such, an opportunity is greater when implemented on a per-core basis.

A pCLTC policy can be implemented to work in concert with existing power management policies. For example, pCLTC can provide a maximum allowable power budget for p-state selection, but actual p-state can be selected after comparing against other PM policies (e.g., hardware power management (HWPM)).

There are systems that can determine a maximum p-state value. For example, a running average algorithm as used for PL1 can be applied to a max package Tj. However, it is not known what performance guarantees such a system would provide (i.e., how much temperature error it would allow). A closed loop performance can set a difference between T_sp and T_trip (e.g., 1 degree, 2 degree). The smaller this difference between a dynamic temperature control (DTC) setpoint and a trip point, the more additional performance that is possible.

A methodology to achieve a pCLTC can be found by developing a controller based on a dynamic model and methodologies for calculating closed loop performance, and estimating how unmodeled dynamics can degrade performance. For example, the controller design can be developed through the following operations. A model for the thermal dynamics can be developed between a core's power and temperature. Assumptions can be made which introduce uncertainty in the thermal model (e.g., ambient temperature, convective cooling, leakage temperature, etc.). Based on the thermal model, a controller (e.g., PID) can be designed. Controller performance can be validated across a variety of workload and ambient conditions (e.g., simulation, empirical experiments, etc.) which may or may not be explicitly modeled. Thermal model and controller design can be revisited, if necessary, to achieve performance by addressing known uncertainties in the model (e.g., varying ambient temperature changes; varying convective heat transfer induced by fan speed changes; non-linear core leakage power; and/or core-to-core thermal coupling). An advanced model/controller can be developed to address uncertainties that can limit DTC performance below desired performance.

Figure 4:
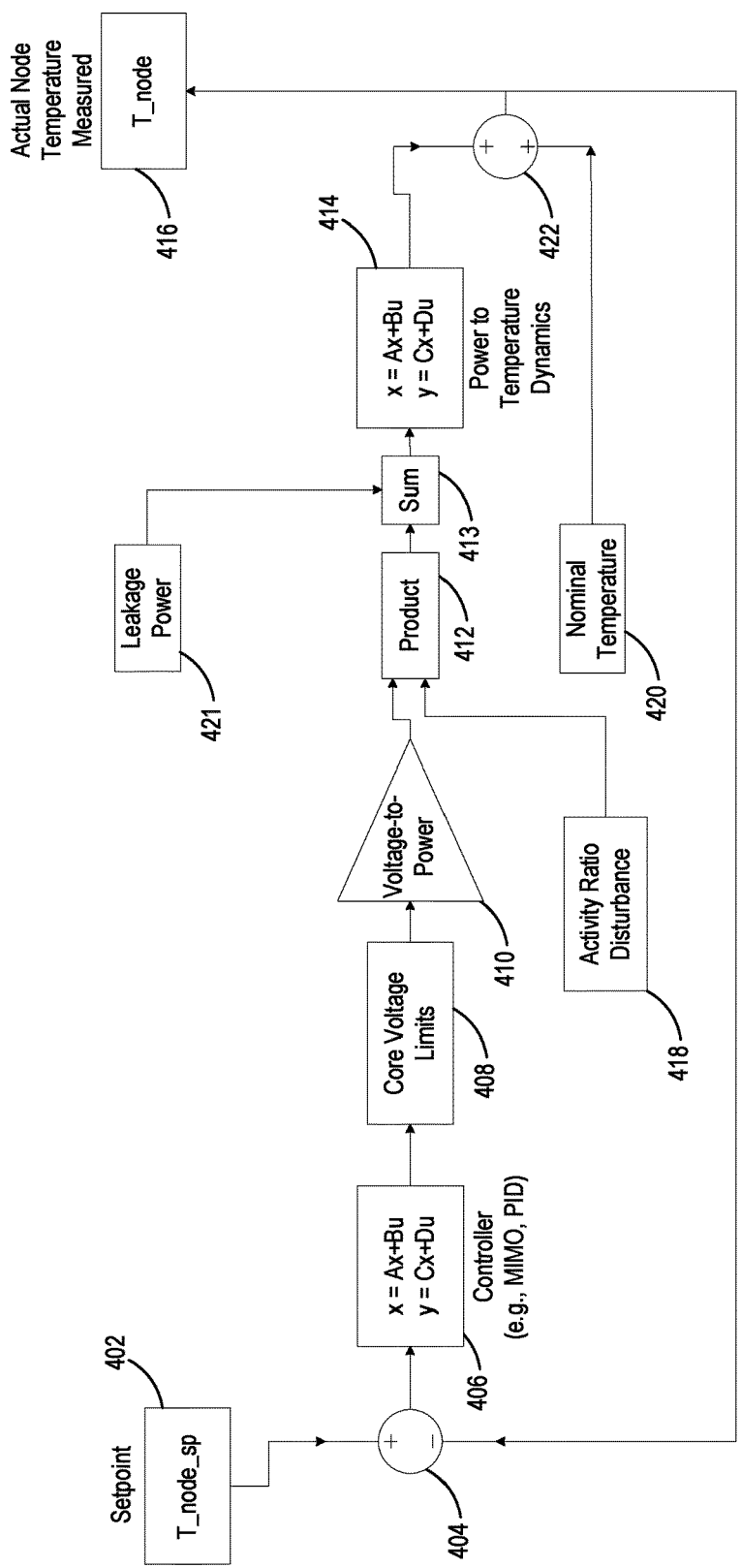
FIG. 4 is a diagram illustrating components of a controller implementation consistent with embodiments disclosed herein.

For example, a controller (such as for an integrated chip) can be constructed as shown in FIG. 4. A setpoint 402 (such as temperature setpoint T_node_sp) can be input into the controller (such as through a power interface that provides a p-state). The setpoint 402 and a difference can be compared in block 404. A controller 406 (such as a MIMO controller, PID controller, PD controller, PI controller, etc.) can receive core temperatures and voltages. Core voltage limits can be implemented in block 408. Block 410 can receive the input from the limits and estimate core power based on voltage. Block 412 can take the output of the voltage-to-power stage 410 and an activity ratio disturbance value 418. Leakage power 421 can be summed with the product from block 412 (representing dynamic power). The sum from block 413 can be used to convert power to temperature in block 414. This temperature output from block 414 can be estimated and combined with nominal power 420 in block 422. The output of block 422 can be used by the system to set and measure the actual temperature 416 (such as through a measurement interface).

For example, given the presence of thermal coupling between cores, a Multiple Input Multiple Output controller design will provide benefits versus de-coupled (separate) Single-Input-Single-Output controllers (e.g., PID). The system can also prevent uncertainties which can be addressed, such as voltage and temperature dependent leakage power and/or workload activity ratio.

In the embodiment shown, a format of a MIMO controller in state space format is:

$$\dot{x}=Ax+Bu$$

$$y=Cx+Du$$

where X is core(s) temperatures, U is core temperature error and Y is core voltage(s).

In one embodiment, the controller can be implemented in p-code using the following pseudo code. The following code can be run at each loop iteration of p-code. For simplicity, a PI controller structure is assumed. The appended "1" to a variable name is to designate "core1" and would be replicated for all cores across the die.

Calculate time since last sample/control update. Set flag bit if out of tolerance.

Calculate temperature error for each core based on the following equation:

$$error1=setpoint-t1$$

Calculate integral of error over a finite sample time window.

If necessary to prevent integrator windup, limit the integration sum to a predetermine maximum.

Calculate controller output. For example:

$$Pcontrol1=Kp*error1+Ki*integralsum1$$

Calculate estimate of temperature dependent leakage assuming a nominal (conservative) assumption of voltage and measured temperature. The following relationship can be used:

$$Pleak=V1*Io1\ exp\ \hat{}(u1(Vref-V))exp\ \hat{}(u2(Tref-T))$$

Calculate an estimate of activity ratio (AR) based on an average of previous samples. The previous samples leakage and dynamic power can be used.

$$Pdyn1=Ptotal1-Pleak1$$

$$AR=(Cdyn*V1\hat{}2*Freq1)/Pdyn1$$

Calculate the associated p-state voltage for the remaining dynamic power assuming activity ratio calculated above.

Select the associated p-state from the voltage calculation.

It should be recognized that the operations described herein can be performed out-of-order, in-parallel, in-order, etc. Examples of embodiments are given, which may describe the operations in an order to aid in clarity. However other orderings can be possible.

Figure 5:
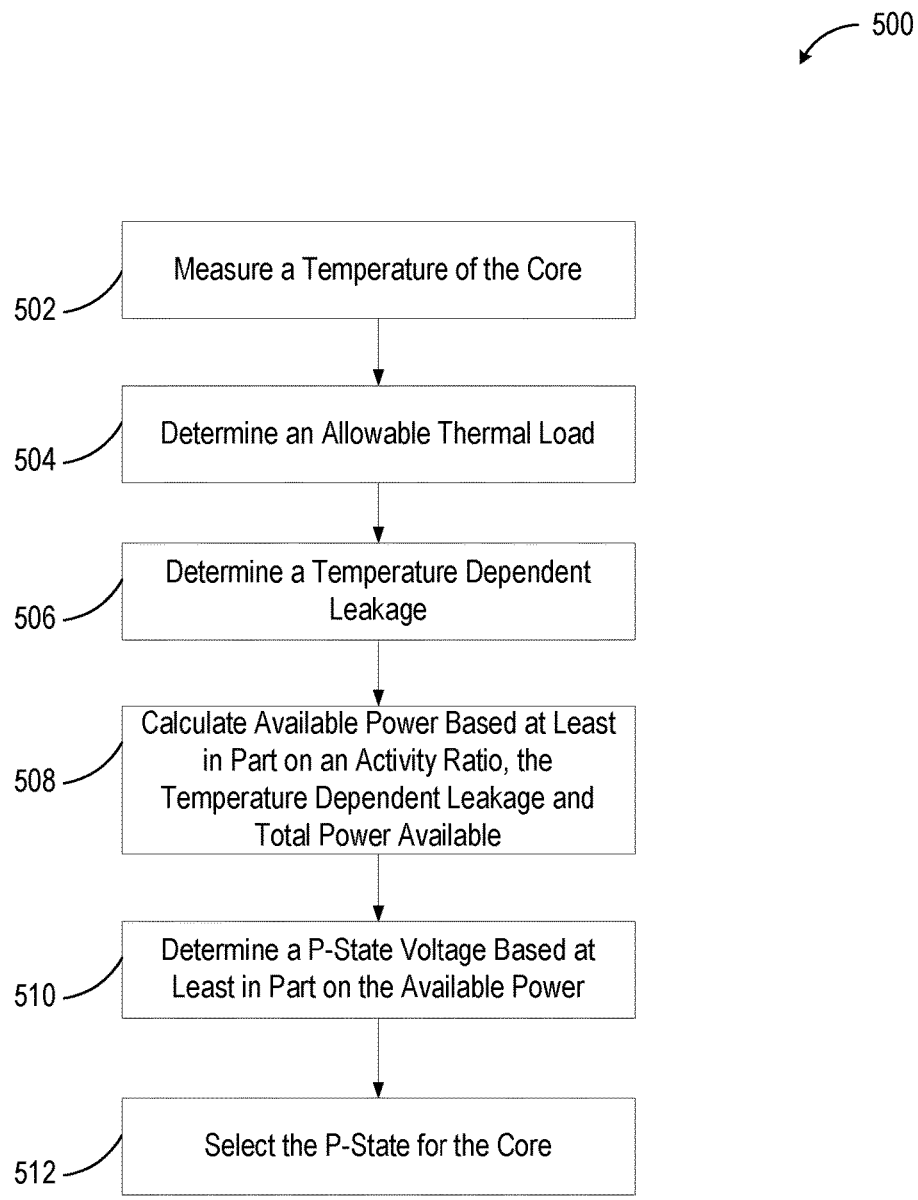
FIG. 5 is a block diagram illustrating a method for dynamic temperature control consistent with embodiments disclosed herein.

FIG. 5 is a block diagram illustrating a method 500 for dynamic temperature control. The method 500 can be accomplished by systems including those described in conjunction with FIGS. 1, 4, 6 and 7. For example in block 502, a power unit can measure a temperature of the core. In block 504, the power unit can determine an allowable thermal load. In block 506, the power unit can determine a temperature dependent leakage. In block 508, the power unit can calculate available power based at least in part on an activity ratio, the temperature dependent leakage and total power available. In block 510, the power unit can determine a p-state voltage based at least in part on the available power. In block 512, the power unit can select the p-state for the core.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Throughout this disclosure, a hyphenated form of a reference numeral refers to a specific instance of an element, and the unhyphenated form of the reference numeral refers to the element generically or collectively. Thus, widget 12-1 refers to an instance of a widget class, which may be referred to collectively as widgets 12, and any one of which may be referred to generically as a widget 12.

Figure 6:
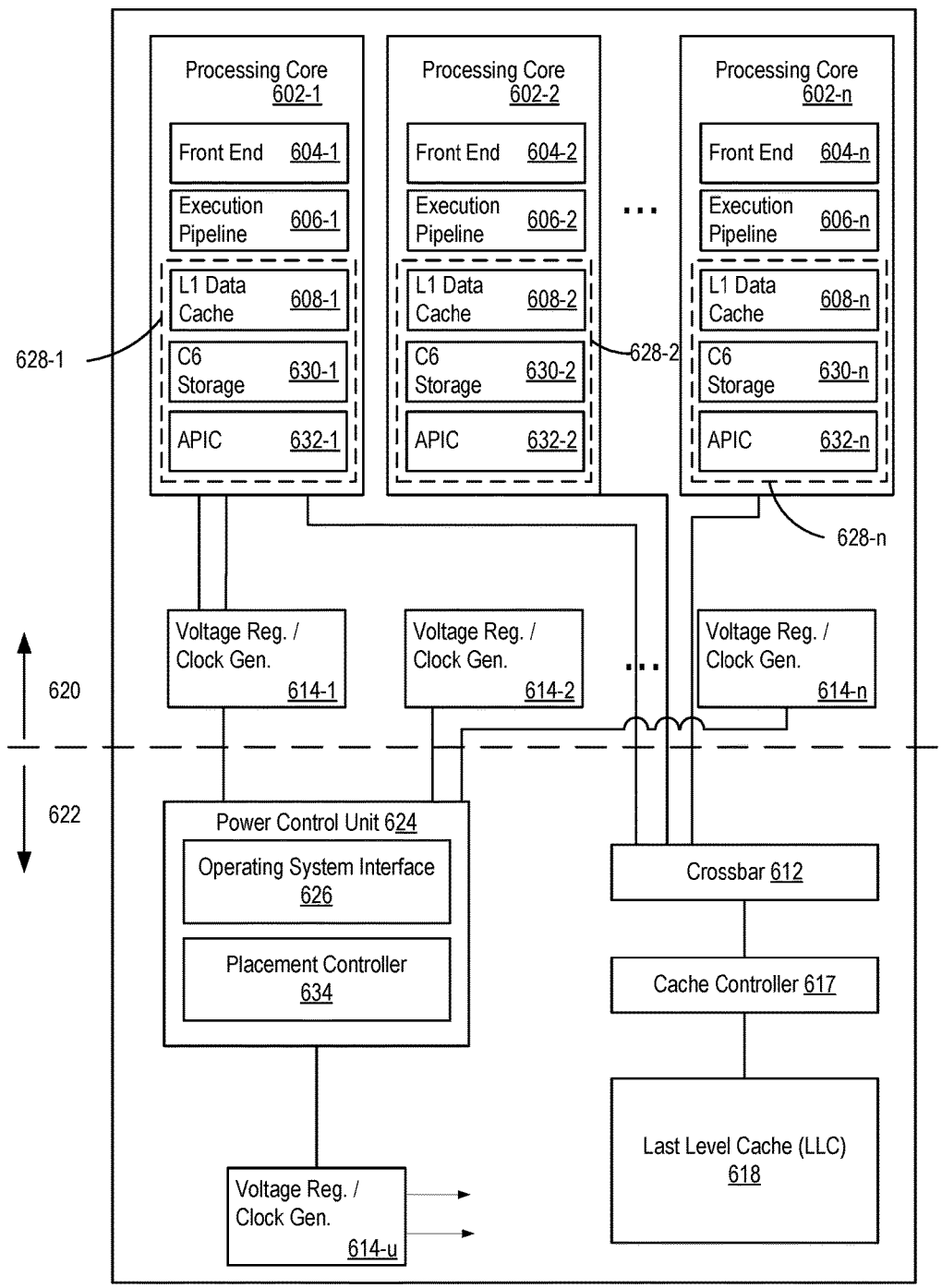
FIG. 6 is a diagram illustrating a multicore processor consistent with embodiments disclosed herein.

FIG. 6 illustrates a multicore processor used in conjunction with at least one embodiment. In at least one embodiment, a processor includes a core region 620 and an uncore 622. In some embodiments, the core region 620 includes multiple processing cores 602, but disclosed functionality may be applicable to single core processors in a multi-processor system. In some embodiments, the processor 601 includes a first processing core 602-1, a second processing core 602-2, and so forth through an n-th processing core 602-n.

In some embodiments, the processing cores 602 include sub-elements or clusters that provide different aspects of overall functionality. In some embodiments, the processing cores 602 include a front end 604, an execution pipeline 606, and a core periphery 628. The core periphery 628 can include a first level (L1) data cache 608, a C6 storage 630 and an advanced programmable interrupt controller (APIC) 632. In at least one embodiment, the front end 604 is operable to fetch instructions from an instruction cache (not depicted) and schedule the fetched instructions for execution. In some embodiments, the execution pipeline 606 decodes and performs various mathematical, logical, memory access and flow control instructions in conjunction with a register file (not depicted) and the L1 data cache 608. Thus, in some embodiments, the front end 604 may be responsible for ensuring that a steady stream of instructions is fed to the execution pipeline 606 while the execution pipeline 606 may be responsible for executing instructions and processing the results. In some embodiments, the execution pipeline 606 may include two or more arithmetic pipelines in parallel, two or more memory access or load/store pipelines in parallel, and two or more flow control or branch pipelines. In at least one embodiment, the execution pipelines 606 may further include one or more floating point pipelines. In some embodiments, the execution pipelines 606 may include register and logical resources for executing instructions out of order, executing instructions speculatively, or both. A hyperthread core is a core that is capable of execution of two or more instructions in parallel. Each execution pipeline 606 of a core is called a hyperthread. A hyperthread can be exposed to an operating system as a logical core.

The core periphery 628 can include logic that supports the front end 604 and the execution pipeline 606, including managing storage and interrupts. The core periphery 628 can include the L1 data cache 608, the C6 storage 630 and the advanced programmable interrupt controller (APIC) 632. The C6 storage 630 can store a context (or state) of the processing core 602 when the processing core 602 transitions into a low-power state (such as a C6 state). A peripheral controller (e.g., the APIC 632) can manage interrupts for the processing core 602, including identifying which interrupts apply to the associated processing core 602 and managing an APIC ID which can be used to identify an associated core.

In at least one embodiment, during execution of memory access instructions, the execution pipeline 606 attempts to execute the instructions by accessing a copy of the applicable memory address residing in the lowest-level cache memory of a cache memory subsystem that may include two or more cache memories arranged in a hierarchical configuration. In at least one embodiment, a cache memory subsystem includes the L1 data caches 608 and a last level cache (LLC) 618 in the uncore 622. In at least one embodiment, other elements of the cache memory subsystem may include a per-core instruction cache (not depicted) that operates in conjunction with the front end 604 and one or more per-core intermediate caches (not depicted). In at least one embodiment, the cache memory subsystem for the processor 601 includes L1 data and instruction caches per core, an intermediate or L2 cache memory per core that includes both instructions and data, and the LLC 618, which includes instructions and data and is shared among multiple processing cores 602. In some embodiments, if a memory access instruction misses in the L1 data cache 608, execution of the applicable program or thread may stall or slow while the cache memory subsystem accesses the various cache memories until a copy of the applicable memory address is found.

In at least one embodiment, the processor 601, the first processing core 602-1, the second processing core 602-2 and the processing core 602-n communicate via a crossbar 612, which may support data queuing, point-to-point protocols and multicore interfacing. Other embodiments of the processor 601 may employ a shared bus interconnect or direct core-to-core interconnections and protocols. In at least one embodiment, the crossbar 612 serves as an uncore controller that interconnects the processing cores 602 with the LLC 618. In some embodiments, the uncore 622 includes a cache controller 617 to implement a cache coherency policy and, in conjunction with a memory controller (not depicted), maintain coherency between a system memory (not depicted) and the various cache memories.

In at least one embodiment, a power control unit (PCU) 624 includes a placement controller 634. The placement controller 634 can monitor workloads of the processing cores 602 and determine which work can be moved to a different core to increase efficiency. Efficiency can be measured in thermal output, power use and/or work accomplished. For example, efficiency can be increased by moving threads between cores that differ due to in-die variation (lower thermal output, decreased power usage, lifetime use management or more work performed). Efficiency can be increased by maintaining a low-voltage operation of a core by not providing a workload above a threshold (i.e., moving threads between cores to prevent a core from operating above a threshold, which is also known as "stressing" a core). Efficiency can be increased by combining multiple threads upon a single hyperthreading core, which saves power of a multi-core overhead. Efficiency can be increased by placing threads on cores that are physically separated to enable a larger spread of heat on the processor die. Efficiency can be increased by spreading heat by moving threads from physical processor to physical processor in sequence to heat different parts of a processor die. Efficiency can be increased by using cores with failed arithmetic units when instructions will not use the arithmetic units, and/or migrating threads between cores when the instructions will use the failed arithmetic units. Efficiency can be increased by performing load balancing for lifetime use management and/or thermal management.

In some embodiments, as a core is used and/or used to perform a large workload, the efficiency of the core decreases. The efficiency decrease can be due to a larger operating voltage and/or a larger thermal output. In some embodiments, a lifetime use of cores can be managed, and workloads transitioned between cores to spread the lifetime usage of cores. In one embodiment, the processor can report a lower core count than actually available on the processor. The workload can be spread among cores to increase the overall lifetime and efficiency of the cores beyond what would be possible without the extra unreported cores. In some embodiments, threads can be transitioned off of a core to sequester the core. The sequestered core can be tested and/or determine performance characteristics of the core. In one embodiment, core sequestering can be used in conjunction with virtual machine manager solutions. In other embodiments, a sequestered core can be used to support other dedicated-purpose, hidden execution arrangements.

In some embodiments, the PCU 624 can decide thread placement among the core and hyperthread resources available. Logical processors can be enumerated to the OS. However, the number of logical processors can be less than a number of physical cores and/or hyperthreads that exist in the processor (i.e., there can be more processor resources than are enumerated to the OS). The OS places work on the logical processors visible to it, and the processor (e.g., the PCU 624) may at a later time migrate a thread to a different resource. For example, the PCU 624 can initiate a sequence that saves the core's context, restores the context to a different core, and redirects a local APIC ID of the previous core to the new core. This migration can occur at the core or thread level. Alternatively, the hardware can provide migration hints to the OS through an operating system interface 626, and the OS can move the work from one core or thread to another.

In at least one embodiment, the core region 620 includes, in addition to the processing cores 602, voltage regulator/clock generator (VRCG) circuits 614 for each processing core 602. In some embodiments, in conjunction with per-core supply voltage signals and clock frequency signals generated by the PCU 624 and provided to each processing core 602, the VRCG circuits 614 support per-core power states by applying a power state indicated by the applicable supply voltage signal and clock frequency signal to the applicable processing core 602, as well as to the uncore 622.

In some embodiments, the PCU 624 is further operable to select processing cores 602 for execution of specific threads and to migrate a thread and its corresponding performance objective or context information from a first core (e.g., the first processing core 602-1) to a second core (e.g., the second processing core 602-2), when the performance characteristics of the second processing core 602-2 make the second processing core 602-2 better suited to achieve a desired efficiency objective than the first processing core 602-1. See, e.g., FIGS. 2 and 3 for a more detailed description of migration.

In some embodiments, the processor 601 may include a hybrid assortment of cores including, in addition to the processing cores 602, graphics cores and other types of core logic. In these hybrid core embodiments, the PCU 624 determines an optimal or desirable power state, not only for the processing cores 602, but also for these other types of core elements in the core region 620. Similarly, in at least one embodiment, the processor 601 includes a VRCG circuit 614-u that provides the power state for the uncore 622 and, in this embodiment, the PCU 624 may determine the optimal or preferred power states for the uncore 622. In some embodiments, the processor 601 supports individualized power states for each processing core 602, any other types of cores in the core region 620, and the uncore 622. Other embodiments may support one power state for the entire core region 620 and one power state for the uncore 622.

The PCU 624 can also include the operating system interface 626. In some embodiments, the PCU 624 can provide recommendations for work placement or migration to an operating system through the operating system interface 626. The operating system can then perform the thread migration between cores. For example, an operating system may not have enough information to recognize that two logical processors are actually associated with one hyperthread core. The PCU 624 can recommend to the operating system that two threads be consolidated on the two logical processors, which can eliminate multi-core overhead.

Figure 7:
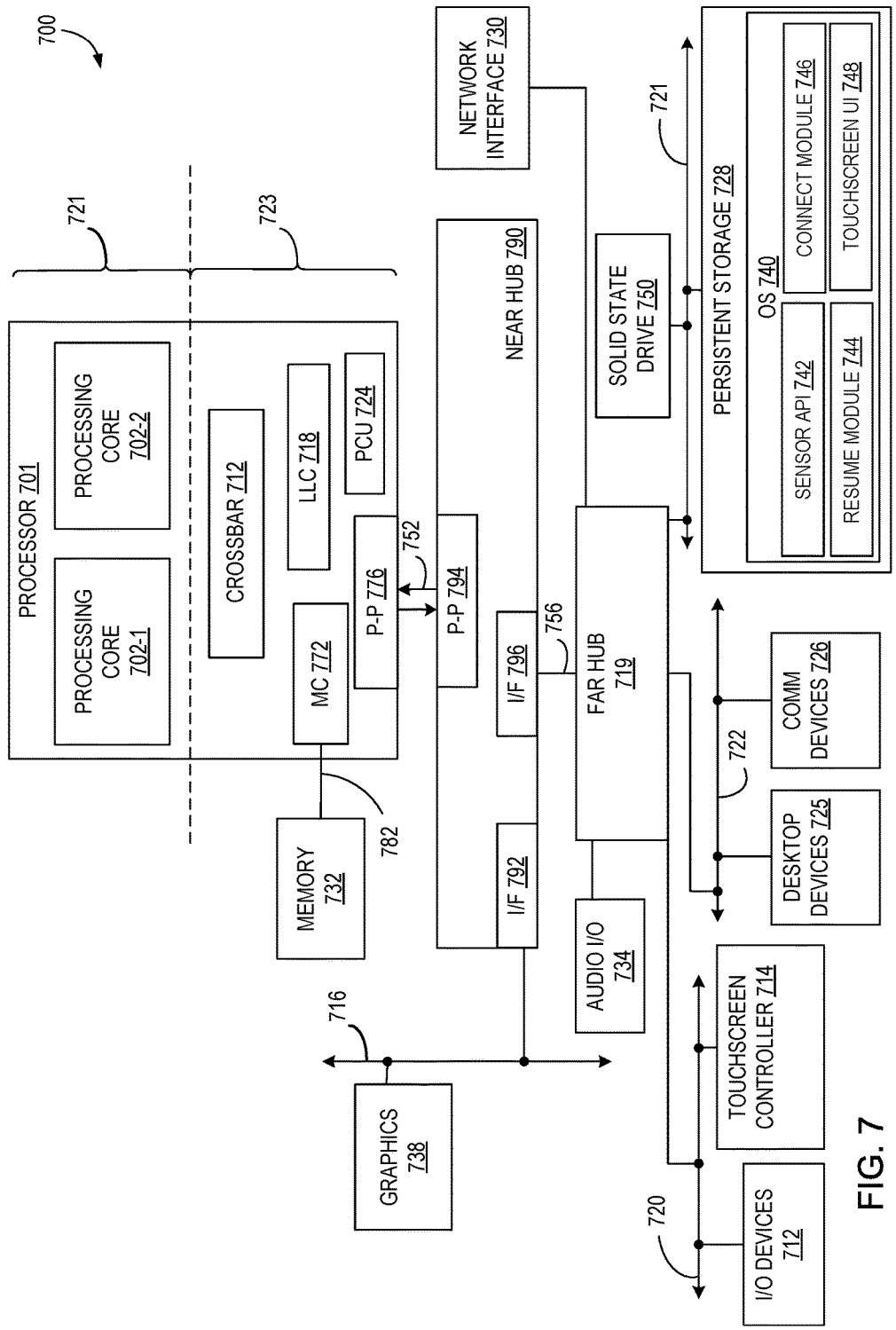
FIG. 7 is a diagram illustrating a computer system consistent with embodiments disclosed herein.

Embodiments may be implemented in many different platforms. FIG. 7 illustrates a computer system 700 used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor is shown in FIG. 7 for descriptive clarity, in various embodiments, a different number of processors may be employed using elements of the illustrated architecture.

In at least one embodiment, the system 700 is a point-to-point interconnect system and includes a processor 701. While in some embodiments the system 700 may include only a single processor, in other embodiments, the system 700 may support multiple processors. In at least one embodiment, the processor 701 is a multicore processor including a first processing core 702-1 and a second processing core 702-2. It is noted that other elements of the processor 701 besides the processing cores 702 may be referred to as the uncore 723, while the processing cores 702 may also be referred to as the core region 721. In different embodiments, a varying number of cores may be present in a particular processor. In at least one embodiment, the processing cores 702 may comprise a number of sub-elements (not shown in FIG. 7), also referred to as clusters, that provide different aspects of overall functionality. The processing cores 702 may, in some embodiments, each include a memory cluster (not shown in FIG. 7) that may comprise one or more levels of cache memory. In some embodiments, other clusters (not shown in FIG. 7) in the processing cores 702 may include a front-end cluster and an execution pipeline cluster. In at least one embodiment, the processing cores 702 may include an L1 data cache. In some embodiments, the uncore 723 may include a crossbar 712, an LLC 718, a memory controller (MC) 772, a PCU 724 and a P-P interface 776. In some embodiments, the PCU 724 may be used to select a specific core based on the individual characteristics of each core on the die and the requirements of the task.

In particular embodiments, the processing cores 702 within the processor 701 are not equipped with direct means of communicating with each other, but rather, communicate via the crossbar 712, which may include intelligent functionality such as cache control, data queuing, P-P protocols, and multicore interfacing. In some embodiments, the crossbar 712 may thus represent an intelligent uncore controller that interconnects the processing cores 702 with the MC 772, the LLC 718, and the P-P interface 776, among other elements. In particular, to improve performance in such an architecture, cache controller functionality within the crossbar 712 may, in some embodiments, enable selective caching of data within a cache hierarchy including the LLC 718 and one or more caches present in the processing cores 702. In at least one embodiment, the crossbar 712 is referred to as a global queue.

In at least one embodiment, the LLC 718 may be coupled to a pair of the processing cores 702, respectively. In some embodiments, the LLC 718 may be shared by the first processing core 702-1 and the second processing core 702-2. In some embodiments, the LLC 718 may be fully shared such that any single one of the processing cores 702 may fill or access the full storage capacity of the LLC 718. Additionally, in some embodiments, the MC 772 may provide for direct access by the processor 701 to a memory 732 via a memory interface 782. In some embodiments, the memory 732 may be a double-data rate (DDR) type dynamic random-access memory (DRAM), while the memory interface 782 and the MC 772 comply with a DDR interface specification. In at least one embodiment, the memory 732 may represent a bank of memory interfaces (or slots) that may be populated with corresponding memory circuits for a desired DRAM capacity.

In some embodiments, the processor 701 may also communicate with other elements of the system 700, such as a near hub 790 and a far hub 719, which are also collectively referred to as a chipset that supports the processor 701. In at least one embodiment, the P-P interface 776 may be used by the processor 701 to communicate with the near hub 790 via an interconnect link 752. In certain embodiments, the P-P interfaces 776, 794 and the interconnect link 752 are implemented using Intel QuickPath Interconnect architecture. In at least one embodiment, the near hub 790 includes an interface 792 to couple the near hub 790 with a first bus 716, which may support high-performance I/O with corresponding bus devices, such as graphics 738 and/or other bus devices. In some embodiments, the graphics 738 may represent a high-performance graphics engine that outputs to a display device (not shown in FIG. 7). In at least one embodiment, the first bus 716 is a Peripheral Component Interconnect (PCI) bus, such as a PCI Express (PCIe) bus and/or another computer expansion bus. In some embodiments, the near hub 790 may also be coupled to the far hub 719 at an interface 796 via an interconnect link 756. In certain embodiments, the interface 796 is referred to as a south bridge. The far hub 719 may, in some embodiments, provide I/O interconnections for various computer system peripheral devices and interfaces, and may provide backward compatibility with legacy computer system peripheral devices and interfaces. Thus, in at least one embodiment, the far hub 719 provides a network interface 730 and an audio I/O 734, as well as interfaces to a second bus 720, a third bus 722, and a fourth bus 721, as will be described in further detail.

In some embodiments, the second bus 720 may support expanded functionality for the system 700 with I/O devices 712 and a touchscreen controller 714, and may be a PCI-type computer bus. In at least one embodiment, the third bus 722 may be a peripheral bus for end-user consumer devices, represented by desktop devices 725 and communication devices 726, which may include various types of keyboards, computer mice, communication devices, data storage devices, bus expansion devices, etc. In certain embodiments, the third bus 722 represents a Universal Serial Bus (USB) or similar peripheral interconnect bus. In some embodiments, the fourth bus 721 may represent a computer interface bus for connecting mass storage devices, such as hard disk drives, optical drives, and disk arrays, which are generically represented by a persistent storage 728 that may be executable by the processor 701.

In at least one embodiment, the system 700 incorporates various features that facilitate a handheld or tablet type of operation and other features that facilitate laptop or desktop operation. In addition, in some embodiments, the system 700 includes features that cooperate to aggressively conserve power while simultaneously reducing latency associated with traditional power conservation performance objectives.

In at least one embodiment, the system 700 includes an operating system 740 that may be entirely or partially stored in the persistent storage 728. In some embodiments, the operating system 740 may include various modules, application programming interfaces, and the like that expose to varying degrees various hardware and software features of the system 700. In at least one embodiment, the system 700 includes a sensor application programming interface (API) 742, a resume module 744, a connect module 746, and a touchscreen user interface 748. In some embodiments, the system 700 may further include various hardware/firmware features including the capacitive or resistive touchscreen controller 714 and a second source of persistent storage such as a solid state drive (SSD) 750.

In some embodiments, the sensor API 742 provides application program access to one or more sensors (not depicted) that may be included in the system 700. Sensors that the system 700 might have in some embodiments include an accelerometer, a global positioning system (GPS) device, a gyrometer, an inclinometer, and a light sensor. The resume module 744 may, in some embodiments, be implemented as software that, when executed, performs operations for reducing latency when transitioning the system 700 from a power conservation performance objective to an operating performance objective. In at least one embodiment, the resume module 744 may work in conjunction with the SSD 750 to reduce the amount of SSD storage required when the system 700 enters a power conservation mode. The resume module 744 may, in some embodiments, flush standby and temporary memory pages before transitioning to a sleep mode. In some embodiments, by reducing the amount of system memory space that the system 700 is required to preserve upon entering a low-power state, the resume module 744 beneficially reduces the amount of time required to perform the transition from the low-power state to an operating performance objective. In at least one embodiment, the connect module 746 may include software instructions that, when executed, perform complementary functions for conserving power while reducing the amount of latency or delay associated with traditional "wake-up" sequences. The connect module 746 may, in some embodiments, periodically update certain "dynamic" applications including email and social network applications, so that, when the system 700 wakes from a low-power mode, the applications that are often most likely to require refreshing are up-to-date. In at least one embodiment, the touchscreen user interface 748 supports the touchscreen controller 714 that enables user input via touchscreens traditionally reserved for handheld applications. In some embodiments, the inclusion of touchscreen support in conjunction with support for the communication devices 726 enables the system 700 to provide features traditionally found in dedicated tablet devices as well as features found in dedicated laptop and desktop systems.

Figure 8:
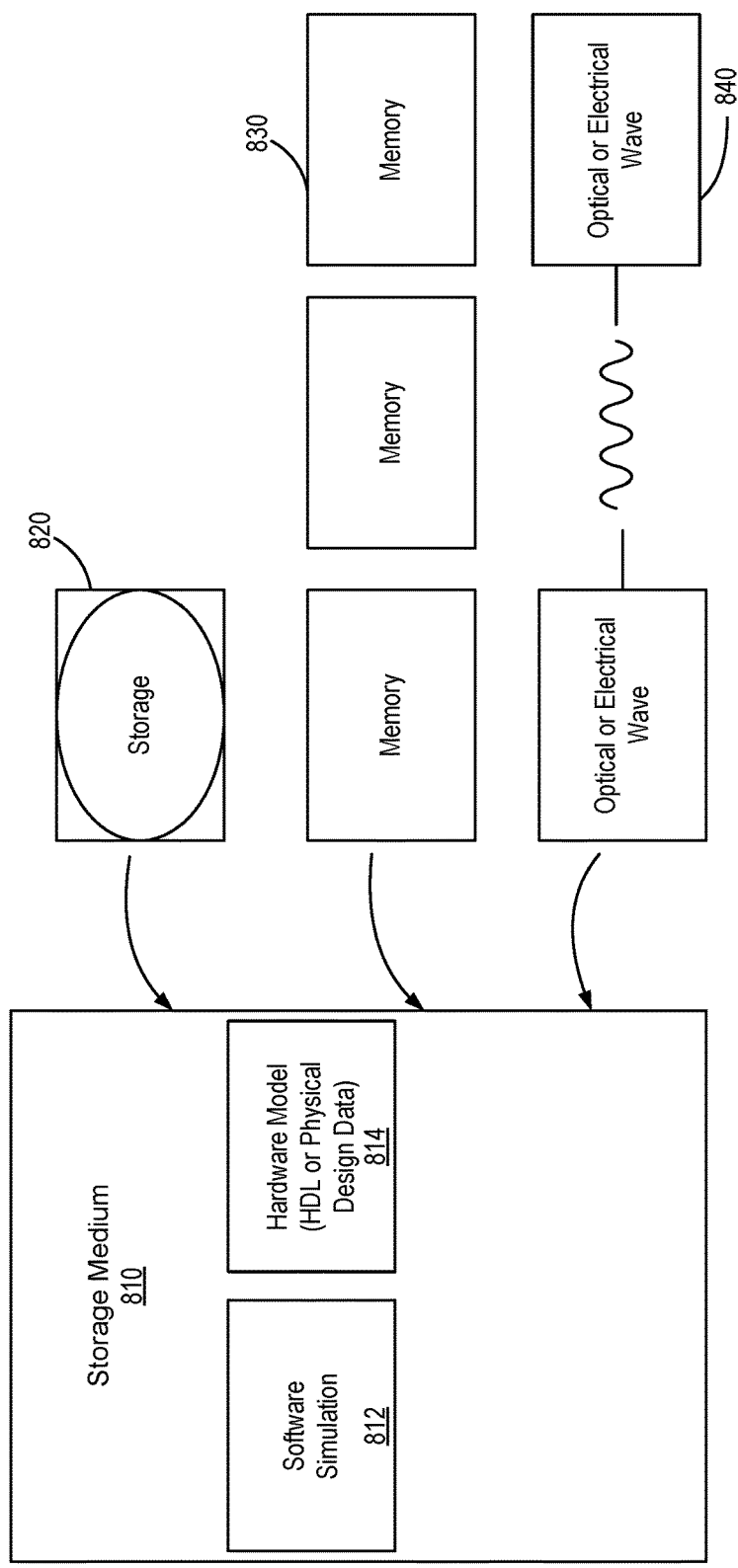
FIG. 8 is a diagram illustrating a representation for simulation, emulation, and fabrication of a design consistent with embodiments disclosed herein.

FIG. 8 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, a hardware model 814 may be stored in a storage medium 810 such as a computer memory so that the hardware model 814 may be simulated using simulation software 812 that applies a particular test suite to the hardware model 814 to determine if it indeed functions as intended. In some embodiments, the simulation software 812 is not recorded, captured or contained in the storage medium 810.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine-readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine-readable medium. In some embodiments, an optical or electrical wave 840 modulated or otherwise generated to transmit such information, a memory 830, or a magnetic or optical storage 820, such as a disc, may be the tangible machine-readable medium. Any of these mediums may "carry" the design information. The term "carry" (e.g., a tangible machine-readable medium carrying information) thus covers information stored on a storage device or information encoded or modulated into or onto a carrier wave. The set of bits describing the design or the particular part of the design is (when embodied in a machine-readable medium such as a carrier or storage medium) an article that may be sold in and of itself or used by others for further design or fabrication.

EXAMPLES

The following examples pertain to further embodiments.

Example 1 is an apparatus for estimating dynamic power in an integrated chip. The apparatus includes a measurement interface, a power interface, and one or more processors. The measurement interface is designed to receive temperature measurements for a variety of cores. The power interface is designed to provide a p-state for each core from a set of cores. Each core from the set of cores in the one or more processors are designed to measure a temperature of the core; determine an allowable thermal load; determine a temperature dependent leakage; calculate available power based in part on an activity ratio, the temperature dependent leakage and total power available; determine a p-state voltage based in part on the available power; and select the p-state for the core.

In Example 2, the subject matter of Example 1 or any of the Examples described herein may further include the activity ratio based on core workload with respect to the p-state voltage.

In Example 3, the subject matter of Example 1 or any of the Examples described herein may further include the temperature dependent leakage based in part on voltage and temperature.

In Example 4, the subject matter of Example 1 or any of the Examples described herein may further include the temperature dependent leakage to be estimated based in part on voltage and measured temperature.

In Example 5, the subject matter of Example 1 or any of the Examples described herein may further include a determination that the allowable thermal load further includes calculating time since last update; calculating temperature error for each core; calculating integral of error over a finite sample time window; and calculating a controller output.

In Example 6, the subject matter of Example 5 or any of the Examples described herein may further include limiting an integration sum to a predetermined maximum to prevent integrator windup.

In Example 7, the subject matter of Example 6 or any of the Examples described herein may further include setting a flag bit when the time since last update is out of tolerance.

In Example 8, the subject matter of Example 5 or any of the Examples described herein may further include calculating the temperature error for each core including determining the error using an equation of error=setpoint−temperature.

In Example 9, the subject matter of Example 5 or any of the Examples described herein may further include calculating the controller output including using an equation of $P_{control}=K_p*error+K_i*integral_{sum}$.

In Example 10, the subject matter of Example 1 or any of the Examples described herein may further include calculating the available power ($P_{dyn1}$) including using an equation of $P_{dyn1}=P_{total1}-P_{leak1}$.

In Example 11, the subject matter of Example 1 or any of the Examples described herein may further include calculating the activity ratio (AR) based on an equation $$AR = \frac{(C_{dyn} * V_1^2 * Freq_1)}{P_{dyn1}}.$$

In Example 12, the subject matter of Example 1 or any of the Examples described herein may further include determining that the allowable thermal load further includes determining allowable power from the allowable thermal load based on a model linking power and the temperature.

In Example 13, the subject matter of Example 1 or any of the Examples described herein may further include determining that the allowable thermal load further includes determining thermal coupling between cores.

In Example 14, the subject matter of Example 1 or any of the Examples described herein may further include the one or more processors designed for a multiple-input, multiple-output controller design for managing temperature of each core.

Example 15 is a processor system for dynamically adjusting power within a thermal budget. The processor system includes a central processing unit, a set of temperature sensors, a power interface, storage for a model of thermal dynamics between power provided to a core and core temperature, and one or more processors. The central processing unit contains a set of cores. The set of temperature sensors are attached to the set of cores. The power interface is designed to provide a p-state to each core from the set of cores. The one or more processors are designed to determine a controller output for each core based in part on the model; calculate an estimate of temperature dependent leakage for each core; calculate an estimate of activity to power ratio for each core based in part on an average of previous samples; calculate an associated p-state voltage for each core for the remaining dynamic power based in part on an activity ratio; and select the p-state associated with the associated p-state voltage for each core.

In Example 16, the subject matter of Example 15 or any of the Examples described herein may further include the controller output to further include calculating time since a last control update; calculating temperature error for each core; calculating integral of error over a finite sample time window; limiting an integration sum to a maximum value; and calculating the controller output based on the error and the integration sum.

In Example 17, the subject matter of Example 15 or any of the Examples described herein may further include the one or more processors configured to implement the associated p-state voltage of each core for at least a next sample period.

In Example 18, the subject matter of Example 15 or any of the Examples described herein may further include the model which further includes a PID controller, PD controller or a PI controller.

In Example 19, the subject matter of Example 15 or any of the Examples described herein may further include the model which further includes data regarding thermal coupling between cores.

In Example 20, the subject matter of Example 15 or any of the Examples described herein may further include the model which further includes data regarding thermal dynamics between power provided to a core and processor temperature.

In Example 21, the subject matter of Example 15 or any of the Examples described herein may further include the model which further includes data regarding temperature dependent leakage.

In Example 22, the subject matter of Example 15 or any of the Examples described herein may further include temperature dependent leakage based in part on voltage and measured temperature.

In Example 23, the subject matter of Example 22 or any of the Examples described herein may further include that temperature dependent leakage ($P_{leak}$) is determined using an equation of $P_{leak}=V_1*I_{o1}e^{u_1(V_{ref}-V)}e^{u_2(T_{ref}-T)}$.

In Example 24, the subject matter of Example 22 or any of the Examples described herein may further include that calculating available power ($P_{dyn1}$) further includes using an equation of $P_{dyn1}=P_{total1}-P_{leak1}$.

In Example 25, the subject matter of Example 22 or any of the Examples described herein may further include that the activity ratio (AR) is calculated based on an equation $$AR = \frac{(C_{dyn} * V_1^2 * Freq_1)}{P_{dyn1}}.$$

Example 26 is a computer program product. The computer program product includes a computer-readable storage medium storing program code. The program code causes one or more processors to perform a method. The method includes measuring a temperature of a variety of cores in a central processing unit (CPU); determining a thermal margin of a core between actual temperature and thermal design power temperature; estimating temperature dependent leakage for a core based on voltage and measured temperature; determining available power based on the thermal margin and temperature dependent leakage; determining an associated p-state voltage for an available power and core demand; and updating a core p-state with the associated p-state voltage.

In Example 27, the subject matter of Example 26 or any of the Examples described herein may further include the determination that the available power based on the thermal margin and the temperature dependent leakage further includes setting a temperature set-point between the thermal design power temperature and the measured temperature.

In Example 28, the subject matter of Example 26 or any of the Examples described herein may further include that the temperature dependent leakage is estimated based in part on voltage and the actual temperature.

In Example 29, the subject matter of Example 26 or any of the Examples described herein may further include the determination that the available power based on the thermal margin and the temperature dependent leakage further includes converting the thermal margin to an estimate of power that results in the thermal margin.

Example 30 is a method for power state selection. The method includes calculating an estimate of temperature dependent leakage of a core; calculating an estimate of activity ratio of the core based on an average of previous samples; calculating an associated p-state voltage of a core for the remaining dynamic power assuming activity ratio calculated; and selecting a e-state for the core using the associated p-state voltage.

In Example 31, the subject matter of Example 30 or any of the Examples described herein may further include calculating a time since last update; calculating temperature error for the core; calculating integral of error for the core over a finite sample time window; limiting the integration sum for the core to a predetermined maximum; and calculating a controller output for the core.

In Example 32, the subject matter of Example 31 or any of the Examples described herein may further include that calculating the time since last update further includes calculating the time since a last sample update or control update.

In Example 33, the subject matter of Example 30 or any of the Examples described herein may further include the method applied to a set of cores.

In Example 34, the subject matter of Example 30 or any of the Examples described herein may further include determining an allowable thermal load of the core, and using the allowable thermal load of the core to estimate a total power available to the core.

In Example 35, the subject matter of Example 34 or any of the Examples described herein may further include determining a thermal coupling effect of other cores to the core.

Example 36 is an apparatus including a manner to perform a method as identified in any of Examples 30-32.

Example 37 is a machine-readable storage including machine-readable instructions, which, when executed, implement a method or realize an apparatus as identified in any of Examples 30-32.

Example 38 is a machine-readable medium including code, which, when executed, causes a machine to perform the method of any one of Examples 30-32.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like.

Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of the embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

Those having skill in the art will appreciate that many changes may be made to the details of the above-described embodiments without departing from the underlying principles. The scope of the disclosure and embodiments should, therefore, be determined only by the following claims.

The invention claimed is:

1. An apparatus for estimating dynamic power in an integrated chip, comprising:
   a measurement interface configured to receive temperature measurements for a plurality of cores;
   a power interface configured to provide a p-state for each core from a set of cores; and
   one or more processors configured to:
     for each core from the set of cores:
       measure a temperature of the core;
       determine an allowable thermal load;
       determine a temperature dependent leakage;
       calculate available power based at least in part on an activity ratio, the temperature dependent leakage and total power available;
       determine a p-state voltage based at least in part on the available power; and
       select the p-state for the core.

2. The apparatus of claim 1, wherein the activity ratio is based on core workload with respect to the p-state voltage.

3. The apparatus of claim 1, wherein the temperature dependent leakage is based at least in part on voltage and the temperature.

4. The apparatus of claim 1, wherein the temperature dependent leakage is estimated based at least in part on voltage and measured temperature.

5. The apparatus of claim 1, wherein to determine the allowable thermal load further comprises to:
   calculate time since last update;
   calculate temperature error for each core;
   calculate integral of error over a finite sample time window; and
   calculate a controller output.

6. The apparatus of claim 5, further comprising to limit an integration sum to a predetermined maximum to prevent integrator windup.

7. The apparatus of claim 6, further comprising to set a flag bit when the time since last update is out of tolerance.

8. The apparatus of claim 1, wherein to determine the allowable thermal load further comprises determining allowable power from the allowable thermal load based on a model linking power and the temperature.

9. The apparatus of claim 1, wherein to determine the allowable thermal load further comprises determining thermal coupling between cores.

10. The apparatus of claim 1, wherein the one or more processors are configured for a multiple-input, multiple-output controller design for managing temperature of each core.

11. A processor system for dynamically adjusting power within a thermal budget comprising:
    a central processing unit comprising a set of cores;
    a set of temperature sensors coupled to the set of cores;
    a power interface configured to provide a p-state to each core from the set of cores;
    storage for a model of thermal dynamics between power provided to a core and core temperature; and
    one or more processors configured to:
      determine a controller output for each core based at least in part on the model;
      calculate an estimate of temperature dependent leakage for each core;
      calculate an estimate of activity to power ratio for each core based at least in part on an average of previous samples;
      calculate an associated p-state voltage for each core for a remaining dynamic power based at least in part on an activity ratio; and
      select the p-state associated with the associated p-state voltage for each core.

12. The system of claim 11, wherein to determine the controller output further comprises to:
    calculate time since a last control update;
    calculate temperature error for each core;
    calculate integral of error over a finite sample time window;
    limit an integration sum to a maximum value; and
    calculate the controller output based on the error and the integration sum.

13. The system of claim 11, wherein the one or more processors are further configured to implement the associated p-state voltage of each core for at least a next sample period.

14. The system of claim 11, wherein the model further comprises data regarding thermal coupling between cores.

15. The system of claim 11, wherein the model further comprises data regarding thermal dynamics between power provided to a core and processor temperature.

16. The system of claim 11, wherein the model further comprises data regarding the temperature dependent leakage.

17. The system of claim 11, wherein the temperature dependent leakage is based at least in part on voltage and measured temperature.

18. A computer program product comprising a non-transitory computer-readable storage medium storing program code for causing one or more processors to perform a method, the method comprising:
    measuring a temperature of a plurality of cores in a central processing unit (CPU);
    determining a thermal margin of a core between actual temperature and thermal design power temperature;
    estimating temperature dependent leakage for a core based on voltage and measured temperature;
    determining available power based on the thermal margin and temperature dependent leakage;
    determining an associated p-state voltage for an available power and core demand; and
    updating a core p-state with the associated p-state voltage.

19. The computer program product of claim 18, wherein to determine the available power based on the thermal margin and the temperature dependent leakage further comprises setting a temperature setpoint between the thermal design power temperature and the measured temperature.

20. The computer program product of claim 18, wherein the temperature dependent leakage is estimated based at least in part on voltage and the actual temperature.

21. The computer program product of claim 18, wherein determining the available power based on the thermal margin and the temperature dependent leakage further comprises converting the thermal margin to an estimate of power that results in the thermal margin.

* * * * *